UNITED STATES PATENT OFFICE.

WILLIAM BEACH PRATT, OF WELLESLEY, MASSACHUSETTS, ASSIGNOR TO E. H. CLAPP RUBBER COMPANY, OF BOSTON, MASSACHUSETTS, A CORPORATION OF MASSACHUSETTS.

PROCESS OF SECURING CERTAIN DERIVATIVES OF TERPENES.

1,380,414.     Specification of Letters Patent.     Patented June 7, 1921.

No Drawing.     Application filed April 22, 1918. Serial No. 229,925.

*To all whom it may concern:*

Be it known that I, WILLIAM BEACH PRATT, a citizen of the United States, residing at Wellesley, in the county of Norfolk and State of Massachusetts, have invented new and useful Improvements in Processes of Securing Certain Derivatives of Terpenes, of which the following is a specification.

This invention relates to the treatment of certain substances containing terpenes including oil or spirits of turpentine, "pine oil," etc., for the production of certain products useful in the arts.

Thurlow in his U. S. Letters Patent No. 726,783, dated April 28, 1903, describes a product said by him to be a mixture of dipentine and certain oxalates and formates, and camphor, and to result from the treatment or rectified and dehydrated turpentine with anhydrous oxalic acid at a temperature of preferably 120° to 130° C. I have discovered, however, that, by treating commercial spirits of turpentine, for example, with commercial hydrated crystalline oxalic acid, under certain conditions, a new product is produced, which apparently does not contain appreciable quantities of formates or oxalates, if any, and which, when subjected to fractional distillation, will yield, according to the fraction, distillates varying from light oils having a boiling point of 135° C. to heavy oils having a boiling point of 255° C., some of which are accumulated at definite boiling points, and leave a residue of still higher boiling point, and which solidifies on cooling to ordinary temperature.

The procedure is as follows:—Commercial spirits of turpentine and a quantity of commercial hydrated crystalline oxalic acid are thoroughly mixed, and the mixture is digested at atmospheric pressure, or above at a temperature of preferably not less than 140°–163° C. for about an hour. The mass is then allowed to cool until the oxalic acid crystallizes out, whereupon the product is decanted and preferably washed to free it from all acid. This product is capable of technological use but it may be now fractionally distilled and separated into its fractions each of which also has its applications industrially.

On subjecting the product to fractional distillation, I have secured the following distillates:—

(1) 130° to 156° C., a mixture of light oils;

(2) 174° to 178° C., a heavier oil, which has a distinct boiling point, and which possesses the characteristics of dipentene;

(3) 202° to 255° C., heavy distillates consisting of mixtures of heavy oils analogous to those of the eucalyptus and camphor series; and (4) a heavy residuum which solidifies on cooling to ordinary temperatures.

The process may be carried out with other terpenes, such as pine oil, hard-wood distillates, etc., and the proportion of the oxalic acid added thereto depends not only upon the raw material but also upon the character of the desired product. For example, when starting with commerical American spirits of turpentine, to produce a product having heavier oils in excess, I add the oxalic acid in the proportion of about 10% by weight, and digest the mass with heat, to wit, about 160° C. at atmospheric pressure or above, whereupon the mass is permitted to cool to allow the crystallization of and separation of the oxalic acid from the product. On the other hand, to secure a product having in excess the lighter oils such as distil at 130° to 156° C., a smaller quantity, say 2.5% by weight, of the hydrated crystalline oxalic acid may be employed. The products in either case may be employed as such, but, on subjection to fractional distillation in the first case, a relatively larger yield of the heavy oils, and in the second case a relatively larger yield of the lighter oils, will be obtained.

The time required for the oxalic acid treatment depends upon the character and origin of the raw material, and also the temperature and pressure at which the action is carried on. Apparently a critical point is reached when the mixture has been heated to a temperature of about 163° C., for at about that point the products of the reaction suddenly pass over in great volume, unless confined in the digester or autoclave. In carrying out the treatment, analogous results to those herein described may be obtained by the use of hydrated oxalic acid in a concentrated aqueous solution; in fact the oxalic acid which has been crystallized out may, on recovery, be again used in this manner for treating another portion of spirits of turpentine.

I have observed that, by retreatment of the distillates of lower boiling points with oxalic acid in the manner described, a larger yield of the heavier oils may be obtained.

The herein described products, including those of fractional distillation, are useful for a wide variety of purposes in the arts, e. g., as solvents, grease and paint removers, furniture polishes, etc. The light oil distillates, which are limpid, colorless and odorless, have a special value as a leather dressing.

While, as I have stated, the product resulting from the oxalic acid treatment may be employed without distillation, nevertheless the primary object which I have in view is to obtain the non-volatile heavy oil residue and distillates whose boiling points are at 202° C. and above. After distilling off those oils whose fractions are less than 202° C., the yield of the heavy oils of the higher fractions may be increased by retreatment of those first mentioned with oxalic acid and redistillation up to 202° C. In fact, the oils, boiling below 202° C., may be repeatedly treated a number of times, and in each instance, on distillation up to 202° C., will leave a residuum of the heavy oils. The heavy oils boiling at 202° C. and above, including the residuum remaining after the fractional distillation at fractions of 202° to 255° C., have a distinct value as a solvent of vulcanized rubber and ebonite.

What I claim is:

1. The herein described process which consists in digesting a mixture of spirits of turpentine and hydrated oxalic acid at a temperature of or above 140° C.; and then separating the acid from the resulting product.

2. The herein described process which consists in digesting a mixture of commercial spirits of turpentine and crystalline hydrated oxalic acid at a temperature of or above 140° C. and at or above atmospheric pressure, separating the acid therefrom, and subjecting the product to fractional distillation to distil off those products which distil at less than about 202° C., thereby leaving a residuum consisting of oils whose boiling points are 202° C. and above.

In testimony whereof I have affixed my signature.

WILLIAM BEACH PRATT.